(12) United States Patent
Shirazawa

(10) Patent No.: US 7,017,694 B2
(45) Date of Patent: Mar. 28, 2006

(54) ELECTRICALLY OPERATED POWER UNIT, ELECTRIC VEHICLE AND ELECTRIC MOTORCYCLE

(75) Inventor: Hideki Shirazawa, Shizuoka (JP)

(73) Assignee: Yamaha Hatsudoki Kabushiki Kaisha, (JP)

( * ) Notice: Subject to any disclaimer, the term of this patent is extended or adjusted under 35 U.S.C. 154(b) by 0 days.

(21) Appl. No.: 10/186,343

(22) Filed: Jun. 27, 2002

(65) Prior Publication Data

US 2003/0010551 A1 Jan. 16, 2003

(30) Foreign Application Priority Data

Jun. 27, 2001 (JP) ............................. 2001-194251

(51) Int. Cl.
*B60K 1/00* (2006.01)

(52) U.S. Cl. .................. 180/65.5; 180/220; 310/68 B; 310/156.32

(58) Field of Classification Search ............. 180/65.5, 180/65.1, 65.6, 205, 206, 207, 220, 65.8; 310/216, 68 B, 61 R, 179, 254, 75 C, 67 A, 310/156.32, 156.33, 156.34
See application file for complete search history.

(56) References Cited

U.S. PATENT DOCUMENTS

| | | | | |
|---|---|---|---|---|
| 3,566,165 A | * | 2/1971 | Lohr | 310/67 R |
| 4,132,281 A | * | 1/1979 | Gaddi | 180/205 |
| 4,536,668 A | * | 8/1985 | Boyer | 310/75 R |
| 4,829,208 A | * | 5/1989 | Uchino | 310/268 |
| 5,014,800 A | * | 5/1991 | Kawamoto et al. | 180/65.5 |
| 5,036,213 A | | 7/1991 | Isozumi | |
| 5,087,229 A | * | 2/1992 | Hewko et al. | 475/149 |
| 5,144,183 A | * | 9/1992 | Farrenkopf | 310/268 |
| 5,272,938 A | * | 12/1993 | Hsu et al. | 74/594.1 |
| 5,294,853 A | * | 3/1994 | Schluter et al. | 310/68 R |
| 5,304,878 A | * | 4/1994 | Oda et al. | 310/67 R |
| 5,442,250 A | * | 8/1995 | Stridsberg | 310/186 |
| 5,505,277 A | | 4/1996 | Suganuma et al. | |
| 5,570,752 A | | 11/1996 | Takata | |
| 5,581,136 A | * | 12/1996 | Li | 310/67 R |
| 5,691,584 A | | 11/1997 | Toida et al. | |
| 5,755,304 A | | 5/1998 | Trigg et al. | |
| 5,818,134 A | * | 10/1998 | Yang et al. | 310/78 |
| 5,826,675 A | | 10/1998 | Yamamoto | |
| 5,915,493 A | | 6/1999 | Nakayama | |
| 5,960,901 A | * | 10/1999 | Hanagan | 180/210 |
| 6,046,518 A | * | 4/2000 | Williams | 310/43 |
| 6,121,711 A | * | 9/2000 | Nakahara et al. | 310/254 |
| 6,199,652 B1 | * | 3/2001 | Mastroianni et al. | 180/229 |
| 6,321,863 B1 | | 11/2001 | Vanjani | |
| 6,590,306 B1 | * | 7/2003 | Terada | 310/75 C |
| 6,765,327 B1 | * | 7/2004 | Hashimoto et al. | 310/90 |
| 2001/0010439 A1 | | 8/2001 | Klingler et al. | |
| 2003/0221887 A1 | * | 12/2003 | Hsu | 180/180 |

FOREIGN PATENT DOCUMENTS

| | | | |
|---|---|---|---|
| EP | 0 980 821 A2 | | 2/2000 |
| EP | 1 270 395 | | 3/2005 |
| JP | 2-37027 | * | 2/1990 |
| JP | 4-185207 | * | 7/1992 |
| JP | 4185207 A | | 7/1992 |
| JP | 11-034965 | | 9/1999 |
| JP | 2003-191883 | * | 7/2003 |

* cited by examiner

*Primary Examiner*—Jeff Restifo
(74) *Attorney, Agent, or Firm*—Knobbe, Martens, Olson & Bear LLP

(57) ABSTRACT

An electronically controlled compact motor and planetary transmission system including a compact control unit and wiring for an electrical vehicle or electric motorcycle. The compact motor and integrated transmission system enables the operator to enjoy a powerful, conveniently sized, lightweight vehicle.

22 Claims, 7 Drawing Sheets

ELECTRICALLY OPERATED POWER UNIT, ELECTRIC VEHICLE AND ELECTRIC MOTORCYCLE

PRIORITY INFORMATION

This application is based on and claims priority to Japanese Patent Application No. 2001-194251, filed Jun. 27, 2001.

BACKGROUND OF THE INVENTION

1. Field of the Invention

The present invention relates generally to an electric powered vehicle using a compact motor and transmission configuration, and more particularly to a compact motor and transmission axially mounted within a wheel hub.

2. Brief Description of Related Art

Conventionally, electric driving units that drive a wheel with an electric motor, as disclosed, for example, JP-A-H11-34965 disclosed electric motors where the motor output shaft is parallel to the wheel axle. The electric driving unit shown in JP-A-H11-34965 is used as a driving source for an electric two-wheeled vehicle and provided with a swing arm for supporting a rear wheel.

The swing arm for supporting the rear wheel has an electric motor, a transmission and an axle that are provided at its oscillating end and also has a control unit for controlling the electric motor that is mounted to the arm section of the swing arm. The electric motor and the transmission are installed such that their shaft axes are parallel to the transverse direction of the vehicle body, the transmission is arranged in front of the axle in the longitudinal direction of the vehicle body, and the electric motor is located above the transmission.

The control is housed in a storage compartment isolated from the electric motor and is electrically connected to the electric motor through wires.

In the conventional electric driving unit described above, one compartment for housing an electric motor and another compartment for housing a control unit are formed separately. To form the separate compartments, larger volumes of partition walls are required, causing the unit to be larger as a whole increasing the production costs. The arrangement in which the transmission and the electric motor are and the transmission and the axle are placed in front of each other also to be larger.

Additionally, long conductive wires for connecting the control unit and the electric motor are required, because the former is located remotely forward from the latter. The expense for manufacturing long conductive wiring needed to allow the control unit to communicate with a remote electric motor increases production costs.

Furthermore, since the conductive wires between the motor compartment and the control unit compartment are exposed externally, those exposed wires may be damaged from pebbles thrown up by the rear wheel during operation. The increase in the number of electrical connections increases the possibility of damage to the electrical connections and the reliability thereof will be reduced.

SUMMARY OF THE INVENTION

Compact, reliable electric vehicle designs promote both functionally and attractive styling. Such compact designs however pose challenges such as providing space for all required components and keeping the various components at an appropriate operating temperature.

One aspect of a preferred embodiment is a compact, axially spaced motor incorporating a planetary transmission on a shared axis and a compact control unit and switching circuits closely proximate the electric motor. The heat generated by the switching circuits is removed by a heat sink providing a large surface area and attached directly to swing arm body.

Another aspect of a preferred embodiment is the use of minimal wiring due to minimal space between various electrical components, allowing the electrical connections to be very short and protected. Where wiring is required, protective insulation is incorporated and the insulated wires are routed on the swing arm and frame to allow for minimal possible damage caused by road debris.

BRIEF DESCRIPTION OF THE DRAWINGS

The foregoing features, aspects, and advantages of the present invention will now be described with reference to the drawings of the preferred embodiments that are intended to illustrate and not to limit the invention. The drawings comprise seven figures in which.

DETAILED DESCRIPTION OF THE PREFERRED EMBODIMENTS OF THE INVENTION

The Overall Construction

With reference to FIGS. 1 through 5 an overall configuration of an electric vehicle 10 and its electric driving unit 12 is described below. The electric vehicle 10 employs the electric driving unit 12, which is configured in accordance with preferred embodiment of the present invention. The described electric driving unit configuration and the associated control unit have particular utility for use with compact two wheeled electric vehicles, and thus, are described in the context of two wheeled electric vehicles. The electric driving unit configuration and the control unit design, however, also can be applied to other types of electric vehicles, such as, for example, power-assisted bicycles and other vehicles.

Figure 1:
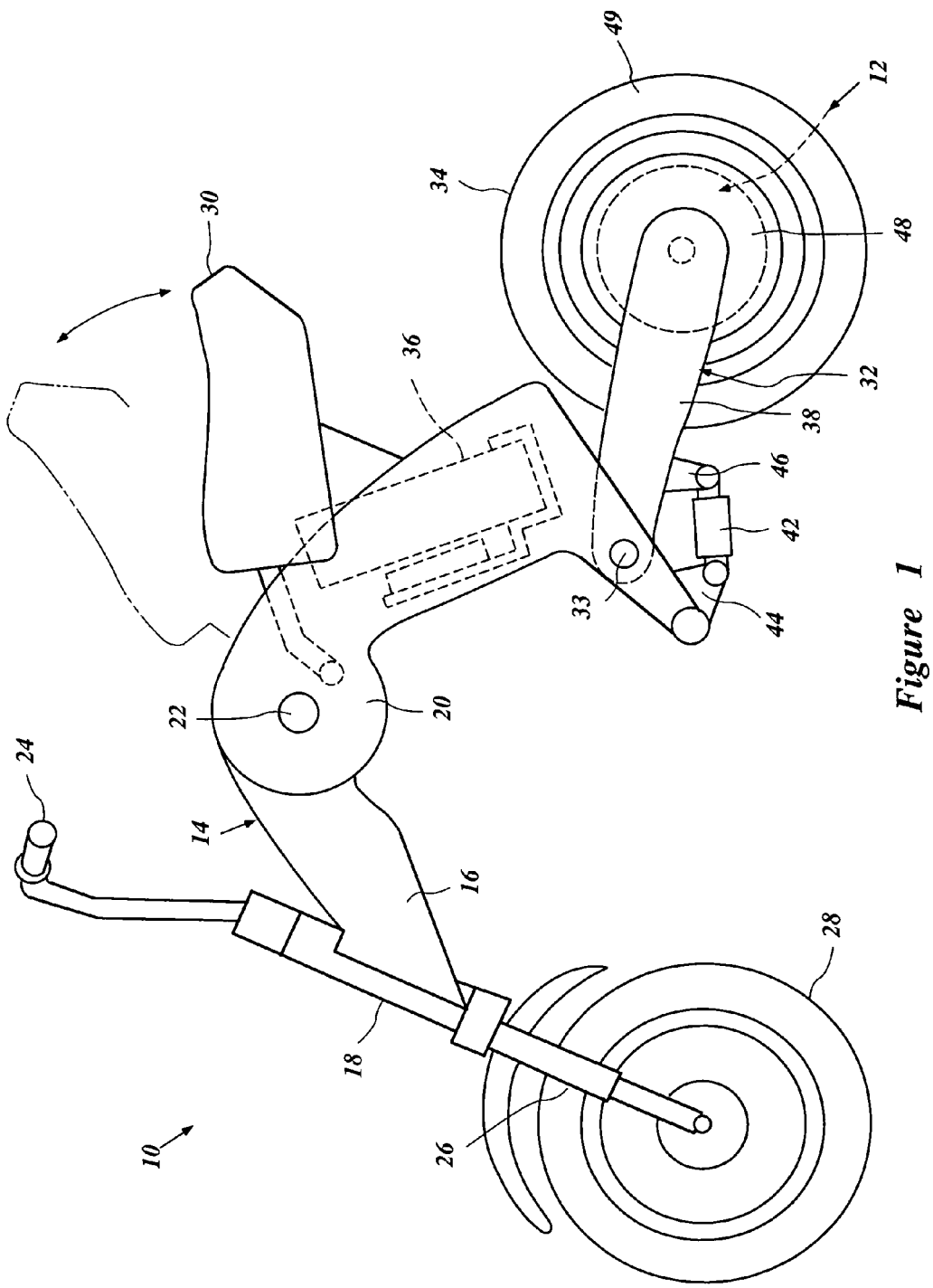
FIG. 1 is an elevated side view of a two-wheeled electrically powered vehicle, with various parts shown in phantom.
Figure 2:
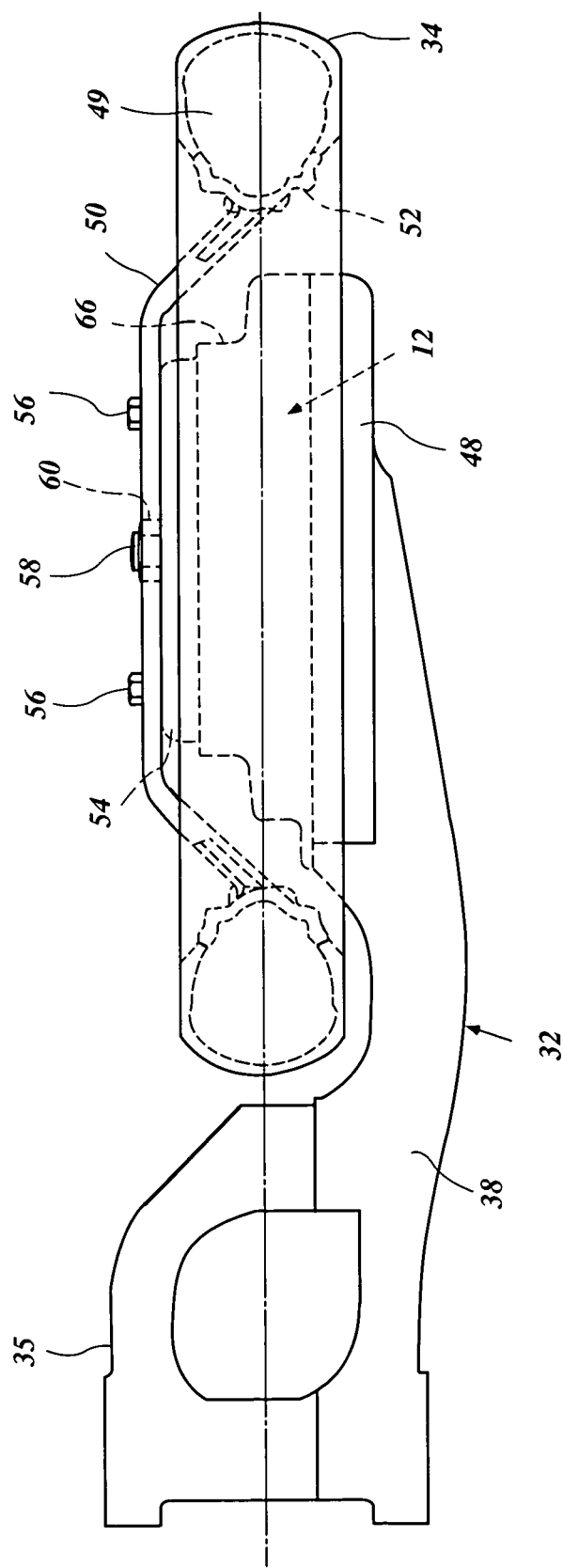
FIG. 2 is downward cross sectional view of a rear trailing arm assembly, with various parts of a rear wheel shown in phantom.

With reference initially to FIG. 1, the electric vehicle 10 includes a foldable vehicle frame 14. The vehicle frame 14 comprises a front frame 16 having a head pipe 18 and a rear frame 20 connected to the front frame 14 through a pivot shaft 22. The head pipe 18 supports a handle bar 24 and a front fork 26, which supports a front wheel 28.

A seat 30 is mounted to the upper portion of the rear frame 20. A swing arm assembly 32 is rotatably mounted through a suspension pivot shaft 33 to the lower side of the rear frame 20. The pivot shaft 33 passed through the lower rear frame 20 to an extended right side portion 35 of the swing arm assembly 32. The swing arm 32 supports a rear wheel 34. The extended portion 35 of the swing arm assembly ensures better stability of the swing arm assembly 32 through a larger pivot shaft surface area allowing for larger lateral loads to be carried by the rear wheel 34.

A battery 36 is installed between the seat 30 and the swing arm 32. The seat 30 is mounted to pivotally rotate on the rear frame 20 to open and close an access opening where the battery 36 is positioned.

The swing arm assembly 32 comprises a swing arm body 38, which extends in a longitudinal direction to the left side of the rear wheel 34. Dampening of the swing arm body 38 oscillations as a result of various road surface conditions is achieved by a rear shock absorber 42. The rear shock absorber 42 is mounted to the rear portion of the rear frame 20 through a shock absorber bracket 44. The rear shock absorber 42 is mounted to the swing arm body 38 through a swing arm shock absorber bracket 46. The electric driving unit 12 is mounted to the right side of the sing arm body 38 through a rear wheel support assembly 48.

The rear wheel support assembly 48 provides support for the rear wheel 34 comprising a rear wheel center section 50, which is attached to a rear rim 52 where a tire 49 is mounted. The rear wheel center section 50 is fastened to a rear brake drum 54 through various lug bolts 56. The rear brake drum 54 is rotatably supported by the rear wheel assembly 48 through a rear axle 58 and is attached to the axle 58 by an axle nut 60.

The rear wheel support assembly 48 is designed to provide a circular surface and cylindrical cavity to allow for the electric drive unit 12 to be mounted. The electric drive unit includes an axial-gap compact electric motor 62 utilizing radially mounted coils 64 placed in a common plane. The compact electric motor 62 utilizes a transmission to transfer torque between the compact electric motor 62 and the rear wheel 34. In the preferred embodiment a planetary transmission assembly 66 is used to transfer the torque from compact electric motor 62, however any type of single speed or multiple speed torque-transfer apparatus as apparent to one of ordinary skill in the art can be used.

A control unit 68 with various switching circuits 70 is used to operate the motor 62. Other types of motors understood by those of ordinary skill in the art can also be used. The control unit 68 and corresponding switching circuits 70 are electrically attached to the coils 64 through various exposed electrical connections 72. The control unit 68 communicates with various components, such as a drivers torque request from a throttle position and a speedometer to inform the operator of the vehicle speed through covered wires 74 and 76. The covered wires 74, 76 are designed to be properly protected from the elements.

Figure 3:
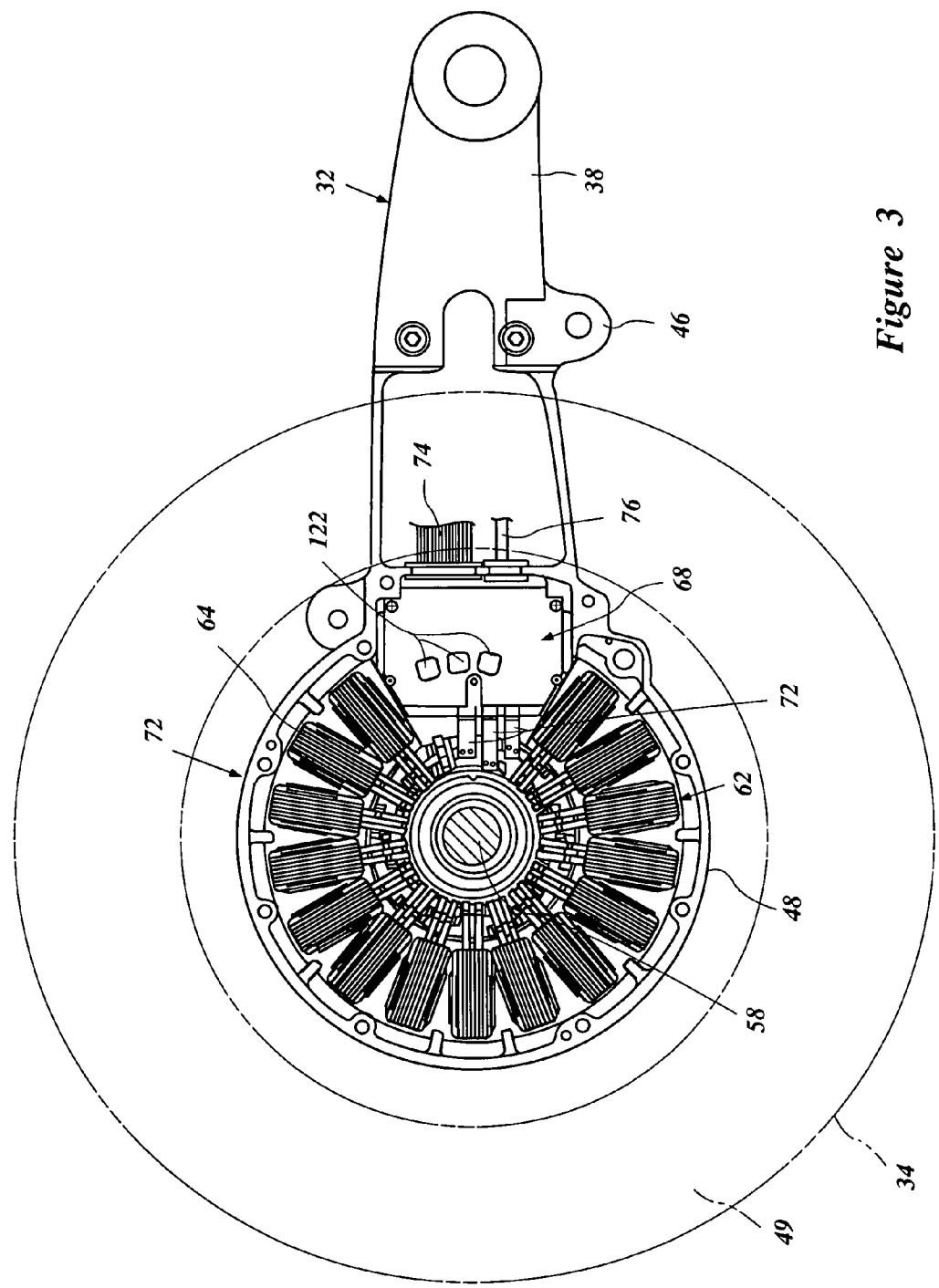
FIG. 3 is an elevated side view of the rear trailing arm and wheel assembly, including a sectioned view of the electric motor.

With reference to FIG. 3 the coils 64 are arranged in a generally circular configuration around the axis of rotation of the electric motor 62. Particularly, they are placed along the inside surface of the rear wheel support assembly 48 of the swing arm body 38 in a "C"-shape arrangement less than 360 degrees of a circle. The opening of the "C", i.e. that part of the 360 degree circle not occupied by coils 64, is formed by deleting one or more coils of a plurality of coils 64 that are otherwise equally placed along the inside surface of the rear wheel support assembly 48. The opening is positioned to provide adequate space for the control unit 68 along with the various switching circuits 70. Such a arrangement of mounting the control unit 68 and switching circuits 7 in place of a number of coils 64 allows for a very compact construction.

Figure 4:
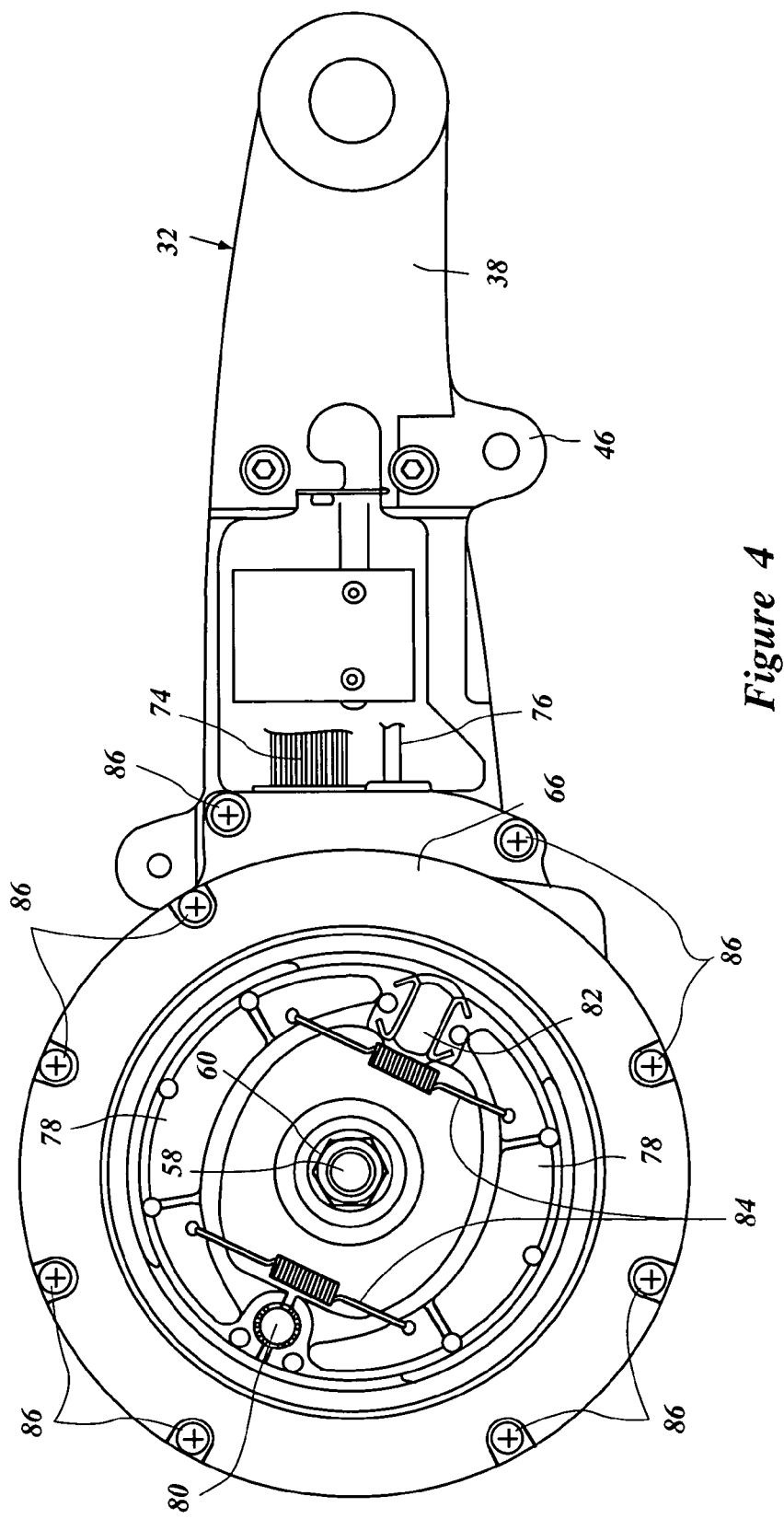
FIG. 4 is another elevated side view of the rear trailing arm, including a sectioned view of the rear wheel brake assembly.

FIG. 4 illustrates a brake drum assembly including a brake drum 54 and two brake shoes 78 supported on one end of each brake shoe 78 by a pin 80 and activated on the other end of each brake shoe 78 by a cam mechanism 82. The cam mechanism 82 activates the brake shoes 78 against two return springs 84. The return springs 84 assure that the brake shoes 78 return to a resting position when not being activated by the cam mechanism 82. The planetary transmission 66 is secured to the rear wheel support assembly 48 through numerous bolts 86.

The Electrically Operated Power Unit

In a preferred embodiment, the electric motor 62 is an axial-gap type electric motor in which the axial rotation of the motor is transverse or perpendicular to the driving direction of the vehicle 10. The electric motor 62 is arranged such that a stator 88 having a plurality of coils 64 is located in the left end portion of the rear wheel support assembly 48. A disk shaped rotor 90 is mounted on a rotatable motor shaft 92. A plurality of main or permanent magnets 97 are mounted equidistant from each other on the rotor 90 and are adjacent to the plurality of coils 64 mounted equidistant from each other on the stator 88. Thus, the use of the axial-gap type electric motor 62 allows the coils 64 to be positioned in a common plane and allow for the electric driving unit to be compact in its axial direction. Other types of motors such as a radial type motor, or any motor familiar to a person having ordinary skill in the art can also be used.

The motor shaft 92 is rotatably supported by a plurality of bearings. A large support bearing 94 is located on the left end of the shaft supported by the swing arm assembly 32. A second, smaller bearing 96 is located on the right end of the motor shaft 92 and is mounted in the center inside the axle shaft 58 allowing the motor shaft 92 to rotate independently but along the same turning axis as the axle shaft 58.

The permanent magnets 97 are secured to an outer rotor portion 98 of the rotor 90. An inner rotor portion 100 of the rotor 90 is formed in such away as to allow adequate space for side rotor portions 102 to enclose the planetary transmission 66 providing an overall compact assembly of the electric driving unit 12. The inner rotor portion 100 is connected to the motor shaft 92 to transfer rotational torque.

The planetary transmission 66 is comprised of a sun gear 104 fixed to the motor shaft 92 of the electric motor 62, three planet gears 106 engaging the sun gear 104, and a stationary ring gear 108, which surrounds and engages the planet gears 106. The three planet gears 106 are supported by a planet gear carrier 110 through respective pins 112 allowing each planet gear 106 to be engaged and rotate between the stationary ring gear 108 and the sun gear 104. Axle bearings 114 rotatably support the planet gear carrier 110 with the axle shaft 58. Such a planetary gear arrangement provides a set gear ratio allowing torque produced by the motor to be increased to drive the rear wheel 34 more efficiently. The torque delivered by the motor 62 is translated through the attached sun gear to the planet gears. The planet gear carrier 110 is attached to the axle shaft to deliver the increased translated torque to the rear wheel 34.

Figure 5:
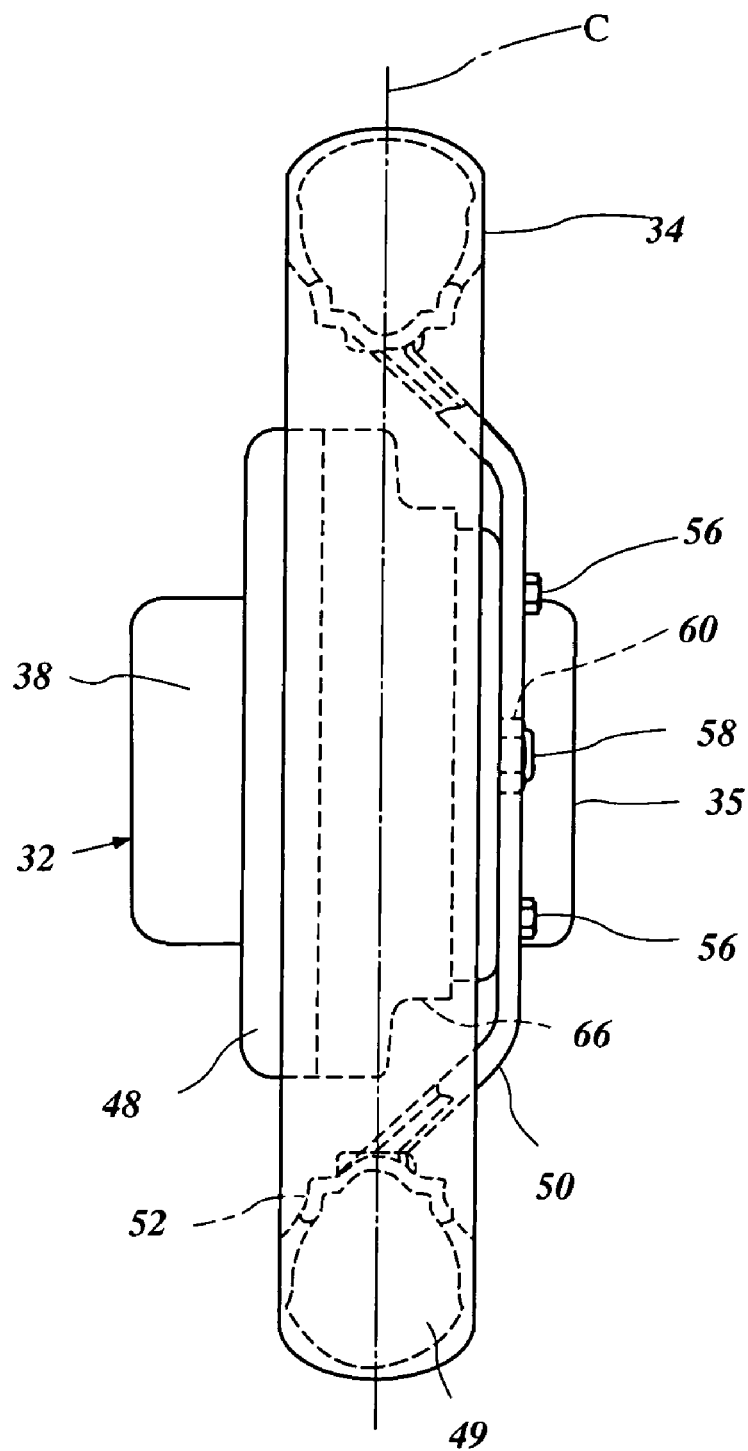
FIG. 5 is an elevated rear sectioned view of the rear wheel assembly, with various parts shown in phantom.

In one preferred embodiment, as shown in FIG. 5, the inner section of the rear wheel center section 50 is placed on the right side of the rear wheel support assembly 48, as seen in the forward direction of the vehicle.

Figure 6:
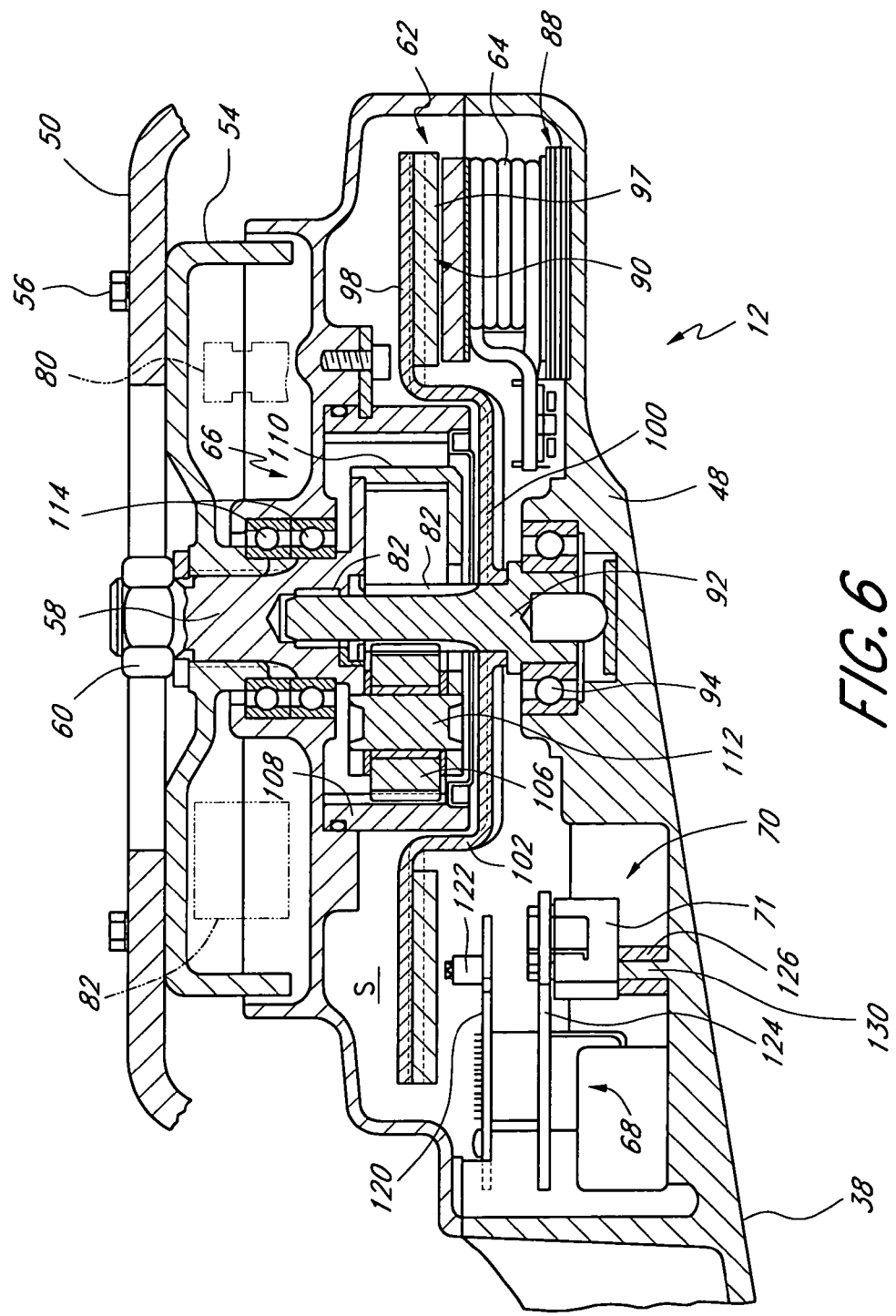
FIG. 6 is sectioned view of the rear trailing arm illustrating the electric motor, a planetary gear set, and a control unit in accordance with a preferred embodiment of the present invention.

The control unit 68, as seen in FIGS. 3, 4 and 6, is disposed between the rear wheel support assembly 48 and the swing arm body 38 along the swing arm assembly 32. The control unit 62 is contained together with the electric motor 62 in a motor storage space S so as to face between two coils 64 of the motor 62.

As seen in FIG. 6, on a surface of a first substrate 120, hall sensors 122 for detecting the position of the rotor are mounted. The switching circuits 70 are mounted on a surface of a second substrate 124. FIG. 3 shows an exposed detection portion of the hall sensors 122 on the right side of the control unit 68 facing the rotor 90, as seen in the forward direction of the two-wheeled electric vehicle 10, to detect the permanent magnets 97 of the rotor 90 and determines the position of the rotor.

Figure 7:
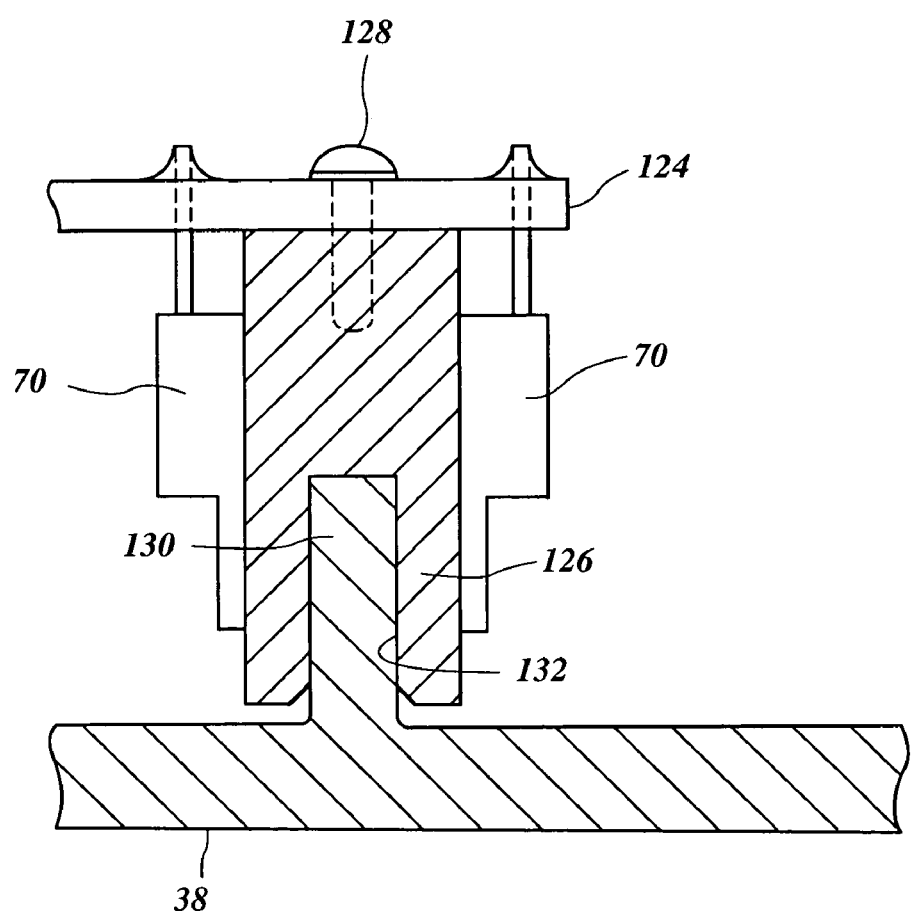
FIG. 7 is a sectioned view of a control unit mounting assembly in accordance with a preferred embodiment of the present invention.

The switching circuits 70 are composed of power transistors and, as seen in FIGS. 6 and 7, are mounted on a heat sink 126, which is connected to the swing arm body 38. The heat sink 126 is secured to the second substrate 124 by a fastening screw 128. In a preferred embodiment, a projection 130 is provided on the swing arm body 38 where the heat sink 126 is fitted. The heat sink 126 has a rectangular cross section having an opening recess fitting on the projection 130. The fitted sections of both the heat sink 126 and the projection 130 provide an increased surface area to more efficiently draw heat produced from the switching circuits 70 to the swing arm body 38 through the projection 130.

As previously discussed, shortened electrical connections 72 for the control 68 and the electric motor 62, as seen in FIG. 3, are used because the control unit 62 is close to the coils 64 and the entire assembly is enclosed within the rear wheel support assembly 48. The wiring 74, 76 connecting the control unit 62 to the battery 36 and to various operator-controlled functions, for example an accelerator (not shown), is protected by insulation. The exposed electrical connections 72 are soldered at one end to the second substrate 124 and the other end is connected to a brush (not shown) of the electric motor 62. The insulated wires 74, 76 are routed along the inner side surface of the front section of the swing arm body 38, as seen in the forward direction of the two wheeled electric vehicle 10.

The electric driving unit 12 of the two-wheeled electric vehicle 10 comprises the electric motor 62 and the planetary transmission 66 coaxially arranged and supported by a rear wheel support assembly 48. Since the control unit 68 for controlling the electric motor 62 is disposed close to the electric motor 62 within a motor storage space S formed in rear wheel support assembly 48, both the control unit 68 and the electric motor 62 are compact in design and the volume of the area enclosing the electric drive unit 12 is reduced.

Specifically, since the two-wheeled electric vehicle 10 is constructed such that the central area of the rear wheel acts as a mounting area for the electric driving unit 12, space is more efficiently used and the two-wheeled electric vehicle is reduced in size. As a result, the width in the transverse direction of the rear wheel 34 becomes narrower. The external appearance of the two-wheeled electric vehicle 10 is improved because the compact electric motor 62 is hidden within the rear wheel 34 in the transverse direction as seen from behind.

The preferred embodiment comprises the control unit 68 mounted close to the compact electric motor 62 and, therefore, the length of the wires for connecting the control unit 68 and the compact electric motor 62 are made shorter. Additionally, the wires for connecting the control unit 68 and the compact electric motor 62 are stored in the motor storage space S allowing for an overall compact design. Since the exposed electrical connections 72 protruding from the control unit 68 are directly connected to the compact electric motor 62, the number of electrical connections can be minimized and the reliability of the electrical connections is improved.

Within the electric driving unit 12, the control unit 68 is disposed between the coils 64 in a stator 88 of the compact electric motor 62. Since the control unit 68 can be located in the space formed between the coils 64, the wiring length between the control unit 68 and the compact electric motor 62 can be made shorter.

The space between coils 64 for housing the control unit 68 is defined by removing three of the coils 34 that are equally spaced in the circumferential direction. The control unit 68 having a size equal to or smaller than the removed three coils 64 can be stored in the electric motor 62 without increasing of the diameter of the compact electric motor 62.

Since the hall sensors 122 for detecting the position of the rotor are mounted on the surface of the first substrate 120 within the control unit 68, a dedicated substrate on which the hall sensors 122 are mounted is not required. The hall sensors 122 are placed to detect the main magnets 97, therefore a special pick-up magnet to provide a signal to the hall sensors 122 is also not required. As a result, the numbers of parts and production costs can be reduced.

Within the control unit 68, the heat sink 126 communicating with the switching circuits 70 is in contact with the swing arm body 38. Therefore, the heat generated by the switching circuits 70 conducts to the arm body 38 through the heat sink 65, which allows the switching circuits 70 to be cooled efficiently. At the contact portion between the heat sink 126 of the switching circuits 70 and the swing arm body 38, the projection 130 provided on the swing arm body 38 is fitted to the rectangular cross sectional opening recess of the heat sink 126, resulting in the increase of surface area 132 between the heat sink 126 and the swing arm body 38 improving the efficiency of heat conduction. The heat sink 126 can move relative to the projection 130 so vibration generated in the swing arm body 38 is not transmitted to the switching circuits 70 via the heat sink 126 and the connection of the switching circuits 70 to the second substrate 63 is protected from the application of any external force.

Although the present invention has been described in terms of a certain preferred embodiments, other embodiments apparent to those of ordinary skill in the art also are within the scope of this invention. Thus, various changes and modifications may be made without departing from the spirit and scope of the invention. Moreover, not all of the features, aspects and advantages are necessarily required to practice the present invention. Accordingly, the scope of the present invention is intended to be defined only by the claims that follow.

What is claimed is:

1. A battery operated electric vehicle in which an electric motor, transmission, and control circuitry are compactly housed together comprising:
   a battery,
   a vehicle body,
   at least one front and one rear wheel rotatably mounted with respect to said body,
   a power unit attached to said body and coupled to an axle of at least one of said wheels comprising
   an electric motor having:

a stator including a plurality of coils mounted in less than a 360° circle around an axis of a motor drive shaft, a permanent magnet rotor attached to the motor drive shaft so that said rotor is juxtaposed said plurality of coils with an air gap therebetween, said transmission housed partially within a space interior of said coils, said transmission being substantially coaxial with said motor drive shaft, and said control circuitry mounted substantially within said power unit, said control circuitry substantially located in the space of said 360° circle not occupied by said stator coils.

2. The electric vehicle of claim 1 wherein said coils are mounted in a plane substantially transverse to a driven wheel axle and said rotor is mounted substantially transverse to said driven wheel axle in juxtaposition to said coils to form an air gap lying substantially in a plane transverse to the driven wheel axle.

3. The electric vehicle of claim 1 wherein said motor drive shaft, said gear reduction assembly, and said driven wheel axle are coaxial.

4. The electric vehicle of claim 1 wherein said control circuit includes a transducer mounted in juxtaposition with said rotor.

5. The electric vehicle of claim 4 wherein said transducer is a Hall element detecting the position of said rotor.

6. The electric vehicle of claim 1 wherein said control circuit includes a switching circuit mounted to a heat sink.

7. The electric vehicle of claim 6 wherein said control circuit includes a power transistor switch.

8. The electric vehicle of claim 1 wherein said vehicle body includes a swing arm supporting said electric motor, transmission, and control circuitry.

9. The electric vehicle of claim 8 wherein said control circuit includes a heat sink directly connected to said swing arm.

10. The electric vehicle of claim 1 wherein said transmission is substantially contained within said electric motor.

11. The electric vehicle of claim 1 wherein said battery is mounted within said vehicle body.

12. The electric vehicle of claim 1 wherein electrical connections between said control circuitry and said battery are enclosed within said vehicle body.

13. The electric vehicle of claim 1 wherein said electric motor and said control circuitry are placed directly next to each other having direct, minimally distanced electrical connections.

14. An electric motorcycle comprising:
a body frame,
a front fork rotatably mounted to said body frame,
a front wheel rotatably supported by said front fork,
a swing arm having one end supported by body frame,
a rear wheel axle rotatably supported at the opposite end of said swing arm,
a power unit attached to the opposite end of said swing arm, said power unit comprising:
an electric motor having
a stator comprising a plurality of coils mounted in a plane parallel to the plane of said swing arm, said coils arranged in a less than 360° formation about the axis of rotation of said rear wheel, and
a rotor rotatably mounted about the axis of rotation of said rear wheel axle in juxtaposition with said stator,
a first gear attached to said rotor, and
a gear set assembly mating with said first gear and connected to said rear wheel axle.

15. An electrically powered wheel for an electric vehicle wherein an electric motor and a transmission are substantially retained within a rim of said powered wheel, said powered wheel comprising:
a motor stator comprising a plurality of coils arranged in a plane substantially perpendicular to an axis of said wheel,
a permanent magnet rotor proximate to said stator with an air gap between said permanent magnet rotor and said stator lying in a plane substantially perpendicular to the axis of said wheel, and
a transmission coupling said rotor to said wheel, said transmission located partially within the plane of said air gap.

16. The electrically powered wheel of claim 15 including a control unit for controlling an electric driving motor.

17. The electronically powered wheel of claim 15 wherein said coils are arranged in a generally "C" shape.

18. The electronically powered wheel of claim 17 wherein said coils are arranged in a generally circular configuration less than 360 degrees.

19. The electrically powered wheel of claim 18 wherein said control unit is located within that portion of the 360° circle not occupied by said coils.

20. An electrically powered vehicle incorporating an electric motor comprising:
a power wheel for providing a propulsive force for said electrically powered vehicle, said wheel having a braking member adapted to be rotatably supported by a wheel support assembly through an axle defining an axis;
a rim extending circumferentially around said braking member and adapted to mount a tire, the wheel support assembly defining a cavity, said wheel support assembly and said rim being connected to each other, at least in part, by a transmission that is disposed between the electric motor and a portion of said wheel for driving the wheel from said electric motor,
said electric motor carried by said wheel support assembly and disposed circumferentially within said wheel support assembly and said rim and extending axially a distance not substantially greater than the axial length of at least one of said wheel support assembly and said rim;
a support arm fixed axially relative to said wheel support assembly in surrounding relation thereto, the arm fixed against rotation by a direct connection to said vehicle; and
a control unit and switching circuits substantially disposed proximal to said electric motor.

21. An electrically powered vehicle incorporating an electric motor comprising:
a power wheel for providing a propulsive force for said electrically powered vehicle, said wheel having a braking member adapted to be rotatably supported by a wheel support assembly through an axle defining an axis;
a rim extending circumferentially around said braking member and adapted to mount a tire, the wheel support assembly defining a cavity, said wheel support assembly and said rim being connected to each other, at least in part, by a transmission that is disposed between the electric motor and a portion of said wheel for driving the wheel from said electric motor, said electric motor carried by said wheel support assembly and disposed circumferentially within said wheel support assembly and said rim and extending axially a distance not substantially greater than the axial length of at least one of said wheel support assembly and said rim;

a support arm fixed axially relative to said wheel support assembly in surrounding relation thereto, the arm fixed against rotation by a direct connection to said vehicle;

a control unit and switching circuits substantially disposed proximal to said electric motor; and a heat sink attached to said switching circuits, said heat sink directly communicating with said supporting assembly.

22. An electrically powered vehicle incorporating an electric motor comprising:

a vehicle body;

a power wheel for providing a propulsive force for said electrically powered vehicle, said wheel having a braking member adapted to be rotatably supported by a wheel support assembly through an axle defining an axis;

a suspension arm that is integrally formed with the wheel support assembly, the suspension arm coupling the power wheel to the vehicle body; and a rim extending circumferentially around said braking member and adapted to mount a tire, the wheel support assembly defining a cavity, said wheel support assembly and said rim being connected to each other, at least in part, by a transmission that is disposed between the electric motor and a portion of said wheel for driving the wheel from said electric motor, said electric motor carried by said wheel support assembly and disposed circumferentially within said wheel support assembly and said rim and extending axially a distance not substantially greater than the axial length of at least one of said wheel support assembly and said rim, wherein the electric motor and transmission are disposed between the wheel support assembly and said portion of the wheel.

* * * * *

UNITED STATES PATENT AND TRADEMARK OFFICE
CERTIFICATE OF CORRECTION

PATENT NO. : 7,017,694 B2 Page 1 of 1
APPLICATION NO. : 10/186343
DATED : March 28, 2006
INVENTOR(S) : Shirazawa It is certified that error appears in the above-identified patent and that said Letters Patent is hereby corrected as shown below:

At column 1, line 46, after "motor are" please insert -- placed is high --, therefor.

At column 1, line 48, after "also" please insert -- causing the unit --, therefor.

At column 2, line 60, please delete "two wheeled" and insert -- two-wheeled --, therefor.

At column 2, line 61, please delete "two wheeled" and insert -- two-wheeled --, therefor.

At column 4, line 4, please delete "a arrangement" and insert -- an arrangement --, therefor.

At column 5, line 45, please delete "two wheeled" and insert -- two-wheeled --, therefor.

Signed and Sealed this

Twelfth Day of December, 2006

JON W. DUDAS
*Director of the United States Patent and Trademark Office*